No. 829,766. PATENTED AUG. 28, 1906.
W. L. CHASE.
COMBINED FURROWING PLOW AND CULTIVATOR.
APPLICATION FILED APR. 14, 1906.
2 SHEETS—SHEET 2.
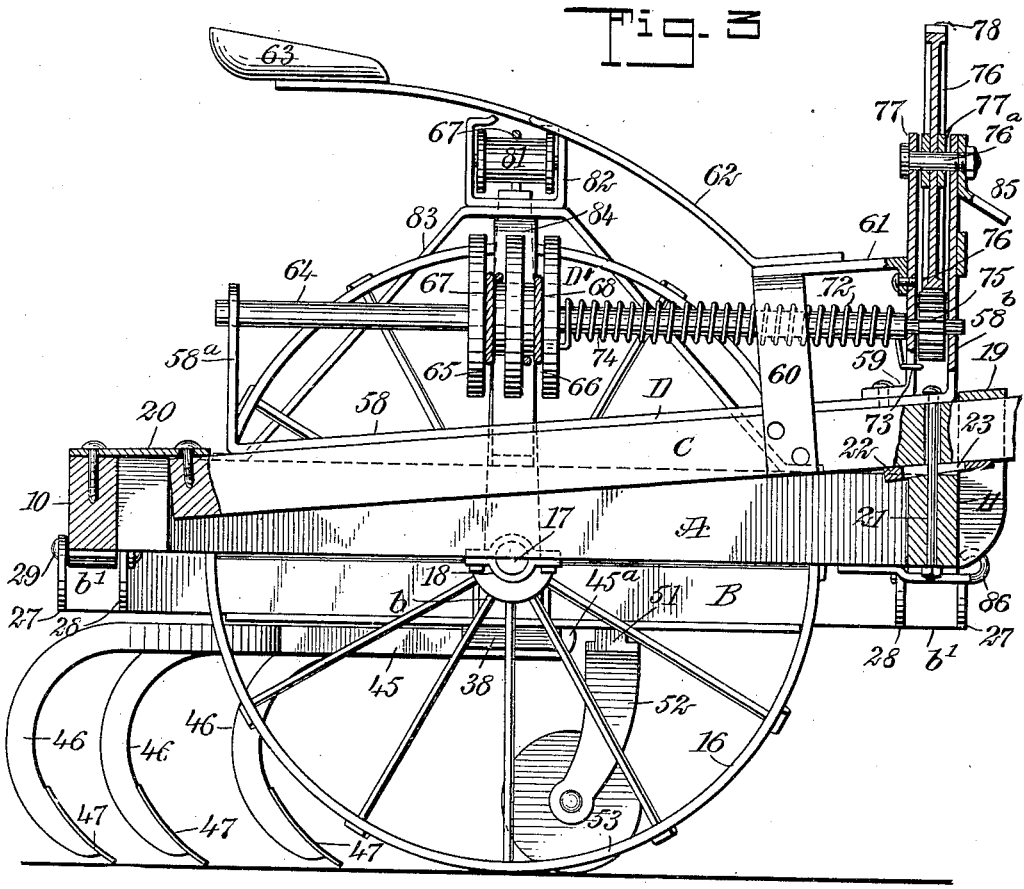
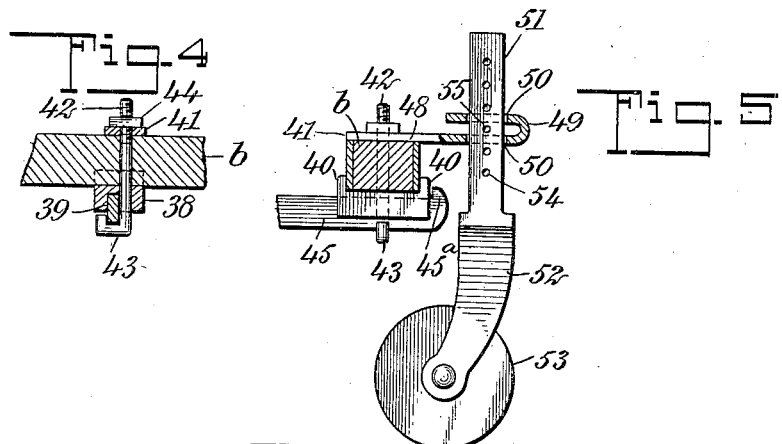
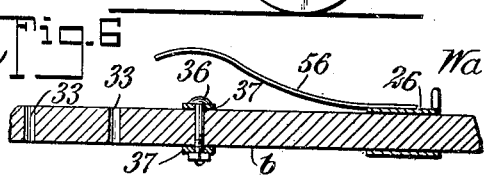
WITNESSES
INVENTOR
Walton L. Chase
BY
ATTORNEYS

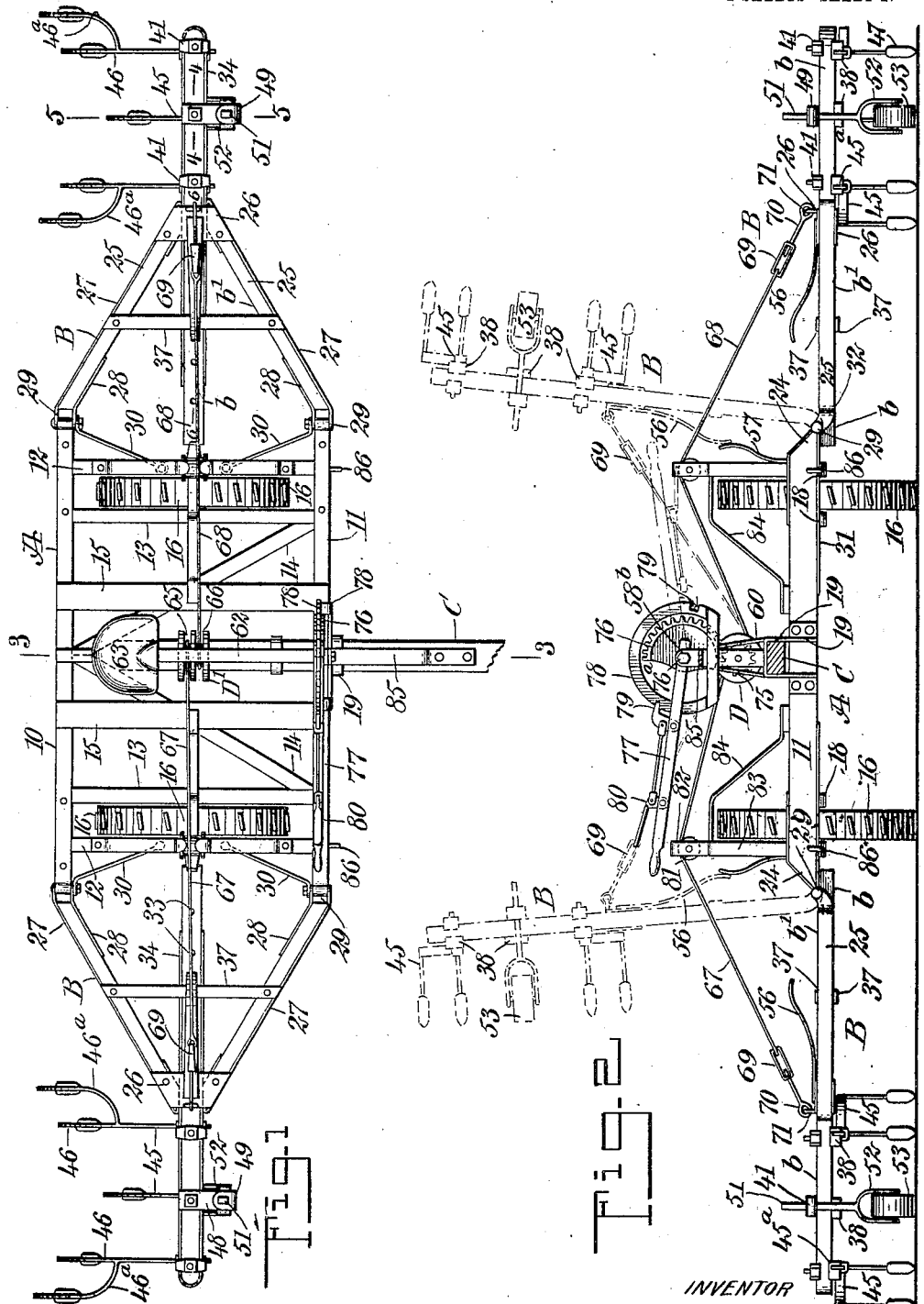

UNITED STATES PATENT OFFICE.

WALTON LAKE CHASE, OF BANNING, CALIFORNIA.

COMBINED FURROWING PLOW AND CULTIVATOR.

No. 829,766.  Specification of Letters Patent.  Patented Aug. 28, 1906.

Application filed April 14, 1906. Serial No. 311,670.

*To all whom it may concern:*

Be it known that I, WALTON LAKE CHASE, a citizen of the United States, and a resident of Banning, in the county of Riverside and State of California, have invented a new and Improved Combined Furrowing Plow and Cultivator, of which the following is a full, clear, and exact description.

The purpose of the invention is to provide an implement, which can be used either as a plow or as a cultivator, especially adapted for operation in an orchard to produce irrigating-furrows near the trees and for cultivating the ground around and near the trees; but it is also equally adaptable for other purposes.

Another purpose of the invention is to hinge the beams to the body of the machine, so that the said beams may be folded in a small space to avoid contact with the trees in turning and also for convenience in coming to or going from an orchard, and to provide a simple mechanism for simultaneously raising and lowering the beams at opposite sides of the body, which means include spring elements which practically balance the beams, rendering the task of elevating them comparatively easy. It is also a purpose of the invention to provide for the adjustability of the beams, whereby to accommodate the machine to different widths between rows of trees.

Another purpose of the invention is to so locate the beams relatively to the body of the implement that the beams may be adjusted quite close to the trees and yet avoid contact with limbs, and also to so elevate the tongue or pole that any required rearward pitch or inclination may be given to the frame to insure the shovels or cultivators entering the ground the desired depth.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the implement.
Fig. 2 is a front elevation thereof. Fig. 3 is an enlarged transverse vertical section taken practically on the line 3 3 of Fig. 1. Fig. 4 is an enlarged detail longitudinal section through a portion of a beam, illustrating the manner in which the shanks of the plows or cultivators are secured to the beams, the section being taken on the line 4 4 of Fig. 1. Fig. 5 is an enlarged detail transverse section through a beam, taken practically on the line
5 5 of Fig. 1; and Fig. 6 is a detail longitudinal section through a portion of a beam, illustrating the manner of its adjustment endwise.

The frame A represents the main frame of the machine, which is provided with a wing B, having a hinge connection one with each side portion of the main frame, and each wing B is of the same construction. The main frame, as illustrated, consists of a rear bar 10, a front parallel bar 11, side connecting-bars 12, an intermediate connecting-bar 13 adjacent to each side bar 12, and diagonal braces 14, which extend from the forward end portions of the intermediate connecting-bars 13 to a connection with the rear bar 10 at the central portion of said bar, as best shown in Fig. 1. In the further construction of the main frame A platform-strips 15 are located at each side of its center, extending from front to rear thereof.

Traction-wheels 16 are located between the side bars 12 and the intermediate connecting-bars 13, the axles 17 of which traction-wheels are journaled in suitable bearings 18, secured to the side and adjacent connecting-bars 12 and 13, as is shown in Fig. 3. These wheels may have rough or smooth treads, as desired.

The tongue or pole C for the implement is located at the central portion of the main frame A and extends from the rear a suitable distance beyond the front of the frame through a stirrup 19, secured to the front central portion of the main frame, extending above said frame, as is shown in Fig. 1, and is usually provided with a neck-yoke. The inner end of the tongue or pole C, as shown in Fig. 3, is secured to the rear portion of the frame at its center or just over the point where the diagonal braces 14 meet by means of a flexible plate 20 or a like connection, so that the forward portion of the pole or tongue may be raised and lowered to a given extent. A bolt 21 is passed through the tongue or pole C and through the central portion of the forward beam or bar 11 of the main frame, as shown in Fig. 3, and this bolt 21 is likewise passed through an opening 23 in a wedge plate or block 22, which is driven between the upper edge of the front beam or bar 11 and the opposing or under surface of the tongue or pole C, so as to give the forward portion of the pole or tongue more or less of an upward inclination, and thus impart more or less of a dip or downward inclination to the rear portion of the main frame, and thereby regulate the depth to which the plows or cultivators to be hereinafter disclosed shall enter the ground.

The end portions of the front and rear bars of the main frame A extend beyond the side bars 12 for a certain distance, and the projecting portions of these front and rear bars are downwardly and outwardly inclined, as shown best in Fig. 2. Each wing B is in two sections—a beam $b$ and a supporting-section $b'$, by which the said beam is carried and in which said beam is adjustable. The supporting-section $b'$ is more or less triangular in plan view, comprising front and rear beams 25, which are made to approach each other at their outer ends, but do not engage, being held separated a sufficient distance to receive the beam $b$ between them by upper and lower plates 26, and the outer face of the bars 25 of said supporting-section $b'$ have usually attached thereto metal straps 27, which extend around the outer ends of the said bars 25 and for a desired distance along the inner faces of said bars. Metal straps 28 are also secured to the inner faces of the bars 25 at their inner or divergent ends, and the straps 28 and the inner end portions of the outer straps 27 extend beyond the inner ends of the bars 25, so as to have hinge connection 29 with the projecting ends of the rear and front bars 10 and 11 of the main frame at their lowest points, as is shown best in Fig. 2. The main frame and the wings at the hinges 29 are usually strengthened by braces 30, which receive the pintles of the hinges and are attached to the side connecting-bars 12 of the main frame, as shown in Fig. 1. The said front and rear bars or beams 10 and 11 of the main frame A are strengthened at their projecting portions by metal straps 31, suitably secured thereto. Where the hinge connection is effected between the supporting-sections $b'$ of the wings B the material of the hinge is given an upward curvature, so as to bring the said supporting-sections and the beams $b$ carried thereby as low as possible below the level of the upper face of the main frame A, so as to carry the wings B out from possible contact with low bearing-limbs. Each beam $b$ is provided with a series of longitudinal apertures 33, and each beam is strengthened by metal straps 34, exteriorly fastened thereto, as shown in Fig. 1, and after a beam $b$ has been suitably adjusted in a supporting-section $b'$ of a wing B a bolt 36 is passed through apertures in transverse straps 37, which extend in parallelism to an engagement with the upper and the lower faces of the said beam-supporting sections, as is best shown in Fig. 6.

At the under face of each beam $b$ any desired number of guide-blocks 38 are transversely located, which guide-blocks have slots in their under faces extending from front to rear, and at the front and rear portion of each guide-block 38 an upwardly-extending flange 40 is formed for engagement with the front and the rear sides of the beam to which the blocks 38 are applied, as is shown in Fig. 5. In connection with each guide-block 38 a clamp 41 is located on the upper face of a beam, and a bolt 42 is passed through each clamp and each guide-block 38 below a clamp. The lower ends of the bolts 42 have a hook terminal 43, which terminals when the bolts are in position are opposite the slots 39 in the guide-blocks 38, as is shown best in Fig. 4, and each of said bolts 42 is provided with a suitable nut 44 at its upper end, having bearing upon the clamp 41, through which the bolt passes. The horizontal portions of shanks 45 are passed through the slots 39 in said guide-blocks 38, and said shanks at their forward ends are provided with upwardly-extending flanges $45^a$, as shown in Fig. 5, so as to limit the rearward adjustments of the said shanks. Each shank 45 is provided with a downwardly and forwardly curved extension 46, located at the rear of the beam, and each of said curved extensions 46 of the shanks 45 is adapted to have attached thereto a cultivator-blade 47, a plowshare, for example, of the shovel type, or an equivalent device for opening up or breaking up the ground. Usually three of these shanks 45 are located at the outer end portion of each beam $b$, and the intermediate shank in the arrangement of such a gang is a single shank, while the extreme inner and outer shanks have branches $46^a$ therefrom, corresponding in curvature to the extensions 46 of the main shanks, and these branches $46^a$ are at the outer side of the outermost main shank and at the inner side of the innermost main shank of a gang. The extensions $46^a$ project farther rearward than do the extensions of the main shanks 45, from which they branch, and the extension of the intermediate main shank is shorter than the shortest extensions of the dual shanks, as is shown in Fig. 1, since this arrangement of the plow or cultivating shanks has been found most advantageous in practice; but I do not necessarily limit myself to such grouping. It will be observed that by loosening and tightening the bolts 42 the horizontal portions of the main shanks 45 can be adjusted in the guide-blocks 38 and be securely clamped to said guide-blocks after adjustment. Preferably the central clamp 41 is in the form of a straight metal strip 48, which is carried some distance forward of a beam $b$, as is best shown in Figs. 1 and 5, and the forward end of such a clamp is provided with a forwardly-curved hook terminal 49, and at said terminal registering apertures 50 are produced, adapted to receive the vertical shank 51, which extends from a fork 52, in which fork a caster-wheel 53 is mounted to turn. The said shank 51 of the caster-wheel is provided with a series of apertures 54, as is shown in Fig. 5, and the caster-wheel is held in adjusted position by passing a pin 55 through one of the apertures 54 and through the hook terminal 49 of the carrier for the caster-wheel frame. By means of these caster-wheels and the adjustment of their carrying-frames vertically relatively to the beams $b$ the said beams $b$ can be brought nearer to or carried farther away from the ground, and thus assist in regulating the depth to which the blades or plows shall enter the ground, and the caster-wheels also serve as roller-supports for the outer end portions of the beams, enabling the implement to be drawn with the least possible amount of friction over rough ground.

The clamps 41, which do not support caster-wheels 53, are preferably made to extend down at their ends at the front and the rear of the beams $b$, as is shown in Figs. 1 and 2. When the wings B are carried upward, as is shown by dotted lines, to reduce the width of the implement, cushion-springs 56, secured to the bottom supporting-sections $b'$ of the wings, engage with cushion-springs 57, extending up from the central portions of the side bars 12 of the main frame, as is shown in Fig. 2, and in this manner the wings are limited in their upward movement, and when such limit is reached the wings are not subjected to jar, and as the cushion-springs 56 and 57 are pressed more or less tightly one against the other when the wings are raised these springs serve to start the wings downward to their working position when released from their upper position. The springs 56 and 57 are preferably in the form of curved leaf-springs, being attached at one end only.

A bracket D is located upon that portion of the tongue or pole C which extends over the main frame A, as is best shown in Fig. 3, and this bracket consists of a lower member 58 and an upwardly-extending rear member $58^a$, together with an upwardly-extending forward member $58^b$, and on the base 58 of the bracket D a standard 59 is secured, adjacent to and parallel with the inner face of the forward member $58^b$ of said bracket, as is also best shown in Fig. 3.

An arched frame 60 is secured to the sides of the pole or tongue, straddling the base member 58 of the bracket D at a point near the upright or standard 59, and is connected therewith by a horizontal brace 61, upon which brace the lower end of the rearwardly-extending seat-support 62 is secured, a proper seat 63 being secured to the rear or free end of the said support, as is shown in Figs. 1 and 3. A shaft 64 is mounted to turn in the upright members $58^a$ and $58^b$ of the bracket D and in the standard 59, and upon this shaft 64 at about a central point a wheel D' is firmly attached provided with two peripheral grooves 65 and 66. Ropes 67 and 68 are attached each to the grooved portion of the wheel D', and as the shaft is turned the ropes will wind thereon in opposite directions or are permitted to unwind from the said wheel. These ropes or chains 67 and 68 are preferably provided with turnbuckles or links 69 at their ends, which carry metal eyes 70, and these metal eyes are engaged by staples 71, usually secured to the upper connecting-plates 26 for the beam-supporting sections $b'$ of the wings B.

A spring 72 is wound around a portion of the shaft 64, and one end 74 of this spring 72 is attached to the wheel D', while the other end 73 is attached to the standard 59 on a nearby fixed support. This spring 72 is always under sufficient tension to just about balance the weight of the wings B, so that when the shaft 74 is turned to wind up the cables 67 and 68 on the wheel-shaft D' to elevate the wings B, as is shown by dotted lines in Fig. 2, very little effort is required to effect such an elevation of the wings. This spring is suitably adjusted when placed in position; but any approved means may be employed for tightening or loosening the spring while in position.

A pinion 75 is secured to the forward end of the shaft 64 between the forward member $58^b$ of the bracket D and the standard 59, as is shown in Fig. 3, and the said pinion 75 meshes with the teeth of a quadrant 76, which quadrant is pivoted by a suitable pin $76^a$ to the upper end portions of the forward member $58^b$ of the bracket D and the upper end of the standard 59. A slotted handle 77 is secured to the said quadrant 76, as best shown in Fig. 2, and this handle 77 travels over a circular guide 78, which surrounds the quadrant 76, as is shown in Fig. 2, and the said guide 78 is attached usually to the outer face of the forward member $58^b$ of the bracket D and is provided with a thumb-latch 80, adapted to enter either one of two or more notches 79 in the guide 78, two notches being usually employed, as shown, and when the thumb-latch enters one of said notches it holdes the wings downward; but when the latch enters the opposing notch the wings are held in an upper position.

The ropes or cables 67 and 68 pass over guide-pulleys 81, which are located in casings 82, open at the top and sides, and these casings 82 are supported by brackets 83, secured to the upper edges of the said beams 12 of the main frame, being braced usually by arms 84, that extend from the top portions of the said brackets downward to the platform-strips 15 of the main frame, and usually a brace 85 is provided for the upper end of the forward member $58^b$ of the bracket D, the said brace 85 being also secured to the tongue or pole C.

An implement of the character described is exceedingly simple for one of its kind, is light, and is well adapted for the purpose intended. It will cover quite an area of ground in transit, and at the same time the implement may be so reduced in dimensions as to pass through a comparatively narrow space.

It may be here remarked that hooks 86 are made to extend from the forward end portions of the main frame A, to which the traces of the team may be secured or to which draft devices may be attached.

Having thus described my invention, I claim as new and desire to secure by Letters Patent—

1. In a combined plow and cultivator, a wheel-supported frame, wings hinged at the sides thereof, shanks adapted to receive cultivator blades or shares adjustably carried by the wings, a winding mechanism common to both of the wings and adapted for raising and lowering the same, which mechanism includes a winding-shaft, means for turning and locking the shaft in adjusted position, a drum mounted on the shaft, and connections between the drum and the said wings.

2. In a combined plow and cultivator, a wheel-supported main frame, wings hinged at opposite sides of the main frame, each wing comprising an adjustable beam and a supporting-section for the beam, the beams extending outward beyond their supporting-sections, a winding mechanism comprising a shaft, means for rotating and locking the shaft, a spring-controlled drum carried by the shaft, cable connections between the drum and the wings, and shanks adapted to carry blades or shares, which shanks are adjustable upon said beams.

3. In a combined plow and cultivator, a wheel-supported main frame, wings hinged at opposite sides of the same, each wing comprising a beam having end adjustment and a supporting-section for the beam, the beams extending outwardly beyond their supporting-sections, a spring-controlled winding mechanism for the wings carried by the main frame and which normally substantially counterbalances the weight of the wings, means for operating and locking the said mechanism, an adjustable supporting-wheel for each beam, and plow or cultivator shanks adjustable upon the beams.

4. In a combined plow and cultivator, a wheel-supported main frame, wings hinged at opposite sides of the same, each wing comprising a beam having end adjustment and a supporting-section for the beam, a spring-regulated winding mechanism for the wings, the regulating-spring substantially counterbalancing the weight of the wings, caster-wheels for the said beams, supports for the said wheels, means for adjusting the wheels in their supports, blocks secured to the under faces of the beams, and shanks for plowshares or cultivator-blades adjustable in said blocks, means for limiting the adjustment of the said shares, and clamping devices for securing the blocks in position on the beam and the shanks in position in the blocks.

5. In a combined plow and cultivator, a wheel-supported main frame, wings hinged at opposite sides of the main frame, the upper faces of the wings being below the plane of the upper face of the main frame, each wing consisting of a supporting-section which is hinged to the main frame, and beams having end adjustment in the supporting-section, buffer-springs carried by the wings and corresponding springs carried by the main frame, which springs are adapted to engage when the wings are elevated, means carried by the beam for holding the shanks of cultivator-blades or plowshares, a shaft mounted on the main frame, a peripherally-grooved wheel secured to the shaft, cables attached to the said wheel and arranged for engagement with the said wings, guides for the cables, means for turning the shaft, and a spring coiled around the shaft, exerting constant tension thereon to a degree to substantially counterbalance the weight of the wings.

In testimony whereof I have signed my name to this specification in the presence of two subscribing witnesses.

WALTON LAKE CHASE.

Witnesses:
ERNEST E. SMALLWOOD,
GEORGE L. BANKS.